United States Patent [19]

Kinoshita

[11] 4,395,349

[45] Jul. 26, 1983

[54] VULCANIZATION ACCELERATOR FOR CHLOROPRENE RUBBER

[75] Inventor: Koji Kinoshita, Takarazuka, Japan

[73] Assignee: Osaka Yuki Kagaku Kogyo Kabushiki Kaisha, Osaka, Japan

[21] Appl. No.: 264,549

[22] Filed: May 18, 1981

[30] Foreign Application Priority Data

Jun. 11, 1980 [JP] Japan .................................. 55/77880
Jan. 27, 1981 [JP] Japan .................................... 56/9582

[51] Int. Cl.$^3$ .......................... C09K 3/00; C08K 9/12; C07C 149/22
[52] U.S. Cl. .................................... 252/182; 260/775; 560/147
[58] Field of Search ........................ 252/182; 260/775; 560/147

[56] References Cited

U.S. PATENT DOCUMENTS 3,112,268 11/1963 Calhoun .......................... 560/147 X
3,144,422 8/1964 Homberg ........................ 560/147 X
3,465,057 9/1969 Cameron et al. ............... 560/147 X

FOREIGN PATENT DOCUMENTS 479708 12/1951 Canada ................................ 560/147
53-50285 5/1978 Japan .
53-52556 5/1978 Japan .

*Primary Examiner*—Richard D. Lovering
*Assistant Examiner*—Catherine S. Kilby
*Attorney, Agent, or Firm*—Stevens, Davis, Miller & Mosher

[57] ABSTRACT

Disclosed is a vulcanization accelerator for chloroprene rubber which has a thioglycolic acid ester as its main component and which gives chloroprene products improved in physical properties, particularly tear strength. A modified vulcanization accelerator obtained by having an inorganic powder impregnated with, or adsorb, a thioglycolic acid ester constitutes a preferred embodiment in respect that it avoids emitting the offensive odor of mercaptan and permits easy handling.

10 Claims, 11 Drawing Figures

— 1 —

VULCANIZATION ACCELERATOR FOR CHLOROPRENE RUBBER

BACKGROUND OF THE INVENTION

1. Field of the Invention

This invention relates to a vulcanization accelerator for chloroprene rubber capable of providing chloroprene rubber products possessed of improved physical properties. More particularly, it relates to a vulcanization accelerator for chloroprene rubber capable of providing chloroprene rubber products improved in physical properties, particularly tear strength and resistance to deterioration, and to a powdery vulcanization accelerator for chloroprene rubber which curbs the emission of odor during the manufacture of rubber products and permits easy handling.

2. Description of the Prior Art

Heretofore, ethylene thiourea (ETU) has been generally used as the vulcanization accelerator for choloroprene rubber. It is toxic and is suspected to be carcinogenic. Thus, appearance of some rubber vulcanization accelerator capable of providing chloroprene rubber products equivalent or superior to those provided by ETU has been in demand.

It has been disclosed that thioglycolic acid is useful as a polymerization regulator or rubber modifier for chloroprene (Japanese Publications of Unexamined Patent Applications Nos. 52556/1978 and 50285/1978). These techniques invariably aim to produce liquid polymers incorporating a terminal carboxyl group by homopolymerizing a chloroprene monomer or copolymerizing a chloroprene monomer with another monomer copolymerizable therewith in the presence of a mercapto-carboxylic acid. These techniques do not contemplate mixing mercapto-carboxylic acid as a vulcanization accelerator to chloroprene rubber immediately before the vulcanization thereof.

To the best of the inventor's knowledge, no one has ever tried incorporation of a thioglycolic acid ester in chloroprene rubber. Presumably the fact that thioglycolic acid esters are liquid and emit the odor peculiar to mercaptane has discouraged all attempts to adopt the esters for use in chloroprene rubber.

SUMMARY OF THE INVENTION

This invention provides a vulcanization accelerator for chloroprene rubber, which has a thioglycolic acid ester as its main ingredient. Particularly, a vulcanization accelerator for chloroprene rubber which is formed by having an inorganic powder impregnated with, or adsorb, a thioglycolic acid ester constitutes itself a preferred embodiment of this invention which is powdery, avoids emitting an odor and permits easy handling.

DETAILED DESCRIPTION OF THE INVENTION

Figure 1:
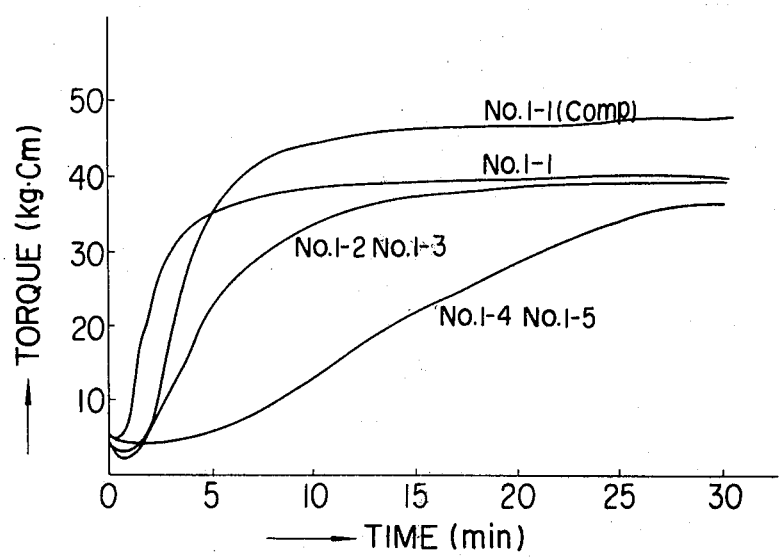
FIGS. 1-11 are graphs showing rheometer curves of chloroprene rubber compositions incorporating the vulcanization accelerator for chloroprene rubber according to the present invention.

The inventor has found that a thioglycolic acid ester which is apparently not usable for the purpose of accelerating vulcanization of chloroprene rubber as described above can be used as a vulcanization accelerator for chloroprene rubber and that, to his astonishment, chloroprene rubber products using this vulcanization accelerator exhibit tear strength 20% higher than that of chloroprene rubber products using the conventional ETU and show other properties parellelling those of the products using ETU. He has also ascertained that a powder obtained by having an inorganic powder impregnated with, or adsorb, the thioglycolic acid ester and pulverizing the resultant impregnated or adsorbed powder avoids emitting the odor peculiar to mercaptane and permits easy handling. This invention has issued from the knowledge.

Typical grades of the chloroprene rubber which are usable for chloroprene rubber compositions contemplated by this invention are W type and G type (sulfur-modified type).

The chloroprene rubber composition of this invention is a mixture having chloroprene rubber as a main ingredient thereof, namely, a mixture prepared by adding to chloroprene rubber a vulcanizing agent such as MgO or ZnO, a dispersant such as stearic acid, a combination reinforcing agent and extender such as carbon black and a process oil, with a thioglycolic acid ester incorporated as a vulcanization accelerator in the mixture.

Examples of the thioglycolic acid ester advantageously usable in this invention are the esters of monohydric alcohols or polyhydric (dihydric through hexahydric) alcohols and thioglycolic acid.

Examples of the monohydric alcohol usable herein include aliphatic alcohols, aliphatic unsaturated alcohols, alicyclic alcohols, aromatic alcohols and heterocyclic alcohols.

Of the polyhydric alcohols, those of the dihydric type first include the alcohols represented by the general formula:

HO—(R$^1$)—OH (wherein, R$^1$ represents a saturated or unsaturated divalent chain type hydrocarbon group, a divalent alicyclic hydrocarbon group or a divalent cyclic hydrocarbon group such as an aromatic hydrocarbon group).

Typical examples of such divalent alcohols are ethylene glycol, propylene glycol, trimethylene glycol, 1,4-butane diol, 1,5-pentane diol, 1,6-hexane diol, 1,7-heptane diol, 1,8-octane diol, 1,9-nonane diol, 1,10-decane diol, pinacol, hydrobenzoin, cyclopentane-1,2-diol, cyclohexane-1,2-diol and cyclohexane-1,4-diol.

Dihydric alcohols which are not included by the general formula given above include ether alcohols. Typical examples of ether alcohols are diethylene glycol, triethylene glycol, polyethylene glycol, dipropylene glycol, tripropylene glycol and polypropylene glycol.

As special dihydric alcohols, there may be cited the compounds represented by the following general formula:

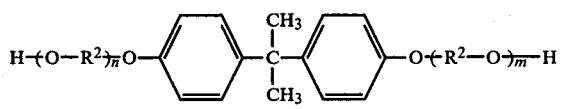

(wherein, n and m represent equal or different integers each having the value of 1 or over and R$^2$ represents a group of $$-CH_2CH_2- \text{ or } CH_3-\underset{|}{CH}-CH_2-).$$

Examples of trihydric and higher polyhydric alcohols which are advantageously usable in this invention include glycerin, trimethylol propane pentaerythritol, dipentaerythritol and the like.

Regarding the proportion in which the thioglycolic acid ester is combined with the mixture having chloroprene rubber as its main ingredient, i.e. the mixture consisting of chloroprene rubber, a vulcanizing agent, a reinforcing agent, a process oil, etc., it is proper from the viewpoint of the physical properties such as tensile strength and permanent compression set acquired by the produced rubber products that the thioglycolic acid ester is added in an amount falling within the range of from 0.1 to 5.0 parts, desirably from 0.1 to 2.5 parts, and preferably from 0.5 to 1.5 parts, respectively by weight based on 100 parts by weight of chloroprene rubber.

In the present invention, the chloroprene rubber composition is obtained by first masticating chloroprene rubber with a kneading machine such as a kneading roll and then adding the thioglycolic acid ester as a vulcanization accelerator in conjunction with a vulcanizing agent, a dispersant, a reinforcing agent and a process oil to the masticated chloroprene rubber and subjecting the entire mixture to kneading. The thioglycolic acid ester can be added, as a rule, at any desired state in the whole step of kneading. Since the thioglycolic acid ester accelerates vulcanization, however, it is desirable that it should be added to the mixture at a stage as close to the final stage of the process of kneading as possible.

From the chloroprene rubber composition prepared by the kneading as described above, a chloroprene rubber product possessed of improved physical properties and enhanced resistance to deterioration can be obtained by subjecting the composition to molding while the composition still retains fluidity and allowing the molded composition to undergo further vulcanization.

Specifically, the chloroprene rubber products using the vulcanization accelerator of this invention, compared with the products using ETU, exhibit high tear strength (increased by about 20%) and modulus, tensile strength and elongation of at least equivalent levels.

Nevertheless, the thioglycolic acid ester is not perfectly free from fault. As touched upon above, the thioglycolic acid ester is a liquid emitting the odor of mercaptane. At the time that this ester is kneaded with chloroprene rubber, therefore, the offensive odor hangs in the air about the kneading machine to spoil the work environment. Further, the thioglycolic acid ester tends to fall off the roll irrecoverably, with the result that the thioglycolic acid ester content in the chloroprene rubber composition is varied to cause possible dispersion of the quality of the final rubber product. Thus, from the standpoint of workability and economy, this liquid vulcanization accelerator proves to be less desirable than other powder vulcanization accelerators.

The inventor continued a diliquent study devoted to the solution of this problem. He has consequently found that the liquid thioglycolic acid ester can be converted into a solid powder by having an inorganic powder impregnated with, or adsorb, the thioglycolic acid ester, that this conversion to the solid powder brings about improved workability and economy and alleviates the offensiveness of mercaptane odor, and that when this solid powder is used as the vulcanization accelerator, the chloroprene rubber products consequently obtained acquire high physical properties and resistance to deterioration comparable with those of the products using the thioglycolic acid ester in a liquid state.

As the inorganic powder required for conversion of the liquid thioglycolic acid ester into the solid powder, any of the inorganic powders generally adopted as inorganic reinforcing agents (rubber-reinforcing agent) and inorganic filler (rubber filler) can be used. Examples of the inorganic powders usable as rubber-reinforcing agents include carbon black, white carbon, activated calcium carbonate (calcium carbonate of the type obtained by subjecting an extremely finely divided calcium carbonate having a particle diameter of not more than $0.1\mu$ to a surface treatment using a small amount of an organic substance), ultra-fine magnesium silicate powder, and hard clay. Examples of the inorganic powders usable as rubber fillers include calcium carbonate, clay, ultra-fine syenite powder, burned clay, silane-modified clay, talc, silica, diatomaceous earth, silica sand and pumice. Besides, alumina, zeolite, activated carbon, etc. can also be used as the inorganic powder for the present invention. To be advantageously used for this invention, the inorganic powder is desired to be such that when it is stirred in neutral water, the pH value of the supernatent liquid is not more than 9, preferably not more than 7. In the case of an inorganic powder which gives a supernatant liquid whose pH value exceeds 7, the mercapto group in the thioglycolic acid ester undergoes gradual oxidation and the ester tends to lose its capacity for accelerating the vulcanization as the solid powder of thioglycolic acid ester is kept in storage. In the case of an inorganic powder which gives a supernatant liquid having a pH value within the range of from 7 to 9, the substance of the organic powder undergoes a neutralization reaction with the residual acid in the thioglycolic acid ester, with the result that the oxidation of the mercapto group proceeds slowly and the decline of the vulcanization acceleration capacity is small. On the other hand, in the acidic zone falling below the level of pH 7, the mercapto group in the thioglycolic acid ester is more stable and does not tend to degrade, so that the vulcanization accelerating capacity is retained. Adsorbability may be cited as another condition in the selection of the inorganic powder. White carbon and carbon black have large capacities for adsorption and, therefore, prove to be good choices.

Inability to cause any chemical change on the thioglycolic acid ester may be cited as yet another condition. In the inorganic powders enumerated above, white carbon and carbon black are widely used as rubber-reinforcing agents and, in the pH test by the method described above, show pH values falling in the acidic zone. Even 60 days after the adsorption (impregnation) of the thioglycolic acid ester, they retain their capacity for accelerating vulcanization substantially intact. Thus, they are good choices also in this respect. As the carbon black, any of the known forms of carbon black such as channel black, furnace black, thermal black and acetylene black can be used. They are used in the range of 10–600 m$\mu$ in particle diameter.

The term "white carbon" means finely divided silicic acid and ordinary silicic acid. Generally, it is an ultra-fine bulky white powder measuring 10 to 50 m$\mu$ in particle diameter. It differs from naturally produced silicic acid and finely pulverized silicates in terms of process of production and quality. For the purpose of the present invention, dry white carbon, wet white carbon, white carbon of synthetic silicate, etc. which are usable as rubber-reinforcing agents are all embraced by the term "white carbon."

The dry white carbon which is advantageously usable herein includes the types produced by:

(i) Thermal decomposition of the silicon halide.

(ii) Air oxidation of SiO which has been produced by thermally reducing the gasifying silica sand.

(iii) Thermal decomposition of an organic silicon compound.

The wet white carbon which is advantageously usable herein includes the types produced by:

(i) Thermal decomposition of sodium silicate.

(ii) Acid decomposition of a silicate of alkaline earth metal.

(iii) Decomposition of organo-gel under pressure.

(iv) Utilization of by-product occurring during the manufacture of calcium perphosphate fertilizer.

The white carbon of synthetic silicate which is advantageously usable herein includes the types produced by:

(i) Reaction of a soluble salt of aluminum or calcium upon sodium silicate.

(ii) Hydrothermal reaction of natural silicic acid or silicate with a hydroxide of alkaline earth metal.

As regards the mixing ratio, it is proper that the thioglycolic acid ester should be used in an amount falling within the range of from 50 to 300 parts, preferably from 150 to 250 parts, by weight based on 100 parts by weight of the inorganic powder. When the amount of the thioglycolic acid ester relative to that of the inorganic powder is excessively large, the produced powdered composition becomes intolerably moist.

Impregnation or adsorption of the thioglycolic acid ester in or upon the inorganic powder is effectively accomplished by having the prescribed amounts of thioglycolic acid ester and inorganic powder placed all at once or portionwise in a mixer such as the high-speed fluidifying mixer which suits mixing of powder and mixed therein. Optionally, either of the two materials involved herein may be gradually added to the mixer while the other material is being mixed therein. Although the mixing time depends on the shape of rotary blades of the mixing machine in use, about 5 minutes' mixing is sufficient where the mixing machine is operated at a rate of 1000 rpm, for example.

Further for the purpose of masking the mercapto odor, the thioglycolic acid ester may be used in conjunction with an odorant at the time that the inorganic powder is impregnated with, or adsorbs, the ester. Examples of the odorant which is advantageously usable herein include coumarin, vanilin, caproic acid and isovaleric acid ester. When the odorant is additionally used, it is to be used in an amount falling within the range of from 10 to 5000 ppm, preferably from 100 to 1000 ppm, based on the composite obtained by the impregnation or adsorption of the thioglycolic acid ester in or on the inorganic powder.

As concerns the method of adding the odorant, this agent may be added to the thioglycolic acid ester at the time that the inorganic powder is impregnated with, or adsorbs, the ester or it may be mixed with the composite obtained by the impregnation or adsorption of the thioglycolic acid ester.

In view of the properties possessed by rubber products to be obtained, it is proper that the vulcanization accelerator produced by converting the thioglycolic acid ester into a solid powder as described above should be used in an amount falling within the range of from 0.3 to 10.0 parts, desirably from 0.3 to 5.0 parts, and preferably from 1.5 to 4.0 parts, respectively by weight based on 100 parts by weight of chloroprene rubber.

A chloroprene rubber composition incorporating the solid powder of the thioglycolic acid ester as the vulcanization accelerator gives chloroprene rubber products having properties equalling those of chloroprene rubber products obtained from a chloroprene rubber composition incorporating the thioglycolic acid ester in its liquid form as the vulcanization accelerator, when the two compositions have one same pure thioglycolic acid ester content.

This invention further provides, as a modified form of vulcanization accelerator for chloroprene rubber, a composition which contains chloroprene rubber in conjunction with a large proportion of the thioglycolic acid ester in its unaltered form or the solid powder obtained by having the inorganic powder impregnated with, or adsorb, the thioglycolic acid ester. Although this composition is not allowed to contain any agent such as zinc oxide which functions to vulcanize chloroprene rubber, it can contain agents such as magnesium oxide and a process oil which have no appreciable effect upon the reaction of vulcanization. In this composition, the thioglycolic acid ester to be contained therein is desired to be incorporated in an amount falling within the range of from 13 to 67 parts, desirably from 20 to 53 parts, and preferably from 27 to 40 parts respectively by weight based on 100 parts by weight of the chloroprene rubber to be simultaneously contained therein. In the case of the composition which contains the solid powder obtained by having the inorganic powder impregnated with, or adsorb, the thioglycolic acid ester, it is desirable to incorporate this solid powder in an amount falling within the range of from 20 to 100 parts, desirably from 30 to 80 parts and preferably from 40 to 60 parts respectively by weight based on 100 parts by weight of the chloroprene rubber. When this composition is used for accelerating the vulcanization of chloroprene rubber, the acceleration of vulcanization is effected to the same degree and the rubber products obtained consequently exhibit the same properties as when the thioglycolic acid ester is used in its unaltered form so long as the pure thioglycolic acid ester concentration is fixed. When this composition which contains the aforementioned components at the prescribed proportions described above is kneaded and molded in the form of chips, it can be used more conveniently as the vulcanization accelerator for chloroprene rubber. When this composition as the vulcanization accelerator is kneaded with the other ingredients and chloroprene rubber in the prescribed proportions in the course of rubber preparation, the alleviation of odor emission and the prevention of dust occurrence are brought to thoroughness.

By practising this invention, the mercaptane odor of the thioglycolic acid ester is alleviated and the work environment is notably improved. If the vulcanization accelerator happens to fall through the intervening spaces between rolls during the kneading of the rubber composition, it can be recovered completely and put to re-use, eliminating the otherwise possible dispersion of the quality of the rubber products consequently obtained. This invention, accordingly, contributes immeasurably to the improvement of manufacturing operation and product quality.

The thioglycolic acid ester accelerates the vulcanization of chloroprene rubber with a vulcanizing agent. Additional use of an organic sulfur compound such as morpholine disulfite or sulfur which serves as a retardant for the vulcanization, therefore, proves advantageous because it permits desired regulation of the speed of vulcanization.

The chloroprene rubber products manufactured by using the vulcanization accelerator of this invention excel particularly in tear strength. Thus, wet suits, rubber boots (including long rubber boots worn by anglers), gaskets used for sealing automobile window frames, etc. which demand high tear resistance constitute ideal uses found for the vulcanization accelerator of the present invention. Other uses found therefor include gaskets in buildings and highway joint sealers.

Now, the present invention will be described below with reference to working examples, which are not meant to limit this invention in any way.

The pH values and the contents of thioglycolic acid ester indicated in the examples cited below are those determined as indicated below.

(i) Method for determination of pH value of inorganic powder

In 200 ml of neutral water (pH 7), 10 g of a sample inorganic powder was added and stirred at room temperature for 30 minutes. The resultant mixture was allowed to stand for 30 minutes to induce sedimentation of the inorganic powder. A portion, 50 to 100 ml in volume, of the resultant supernatant liquid was removed and tested for pH value with a pH meter.

(ii) Method for determination of thioglycolic acid ester content impregnated in or adsorbed on the inorganic powder other than carbon black (determination of SH content)

About 0.15 g (weighed accurately) of a given inorganic powder prepared by the impregnation or adsorption of thioglycolic acid ester was mixed with 10 ml of acetic acid, and the resultant mixture was titrated with an aqueous N/10 iodine solution, with a starch solution as an indicator.

(iii) Method for determination of thioglycolic acid ester content impregnated in or adsorbed on the carbon black (determination of SH content)

About 1.5 g (weighed accurately) of a given carbon black having thioglycolic acid ester impregnated or adsorbed was mixed with 50 ml of acetic acid and stirred for 30 minutes under an atmosphere of $N_2$. Then, the resultant mixture was filtered to remove the carbon black. The separated carbon black was mixed with 40 ml of acetic acid and stirred for 30 minutes. Subsequently, the carbon black was separated by filtration. The two filtrates were combined in a 100-ml measuring flask and diluted with acetic acid accurately to a total volume of 100 ml. An accurately 10-ml portion of the resultant AcOH solution was taken and titrated with an aqueous N/10 iodine solution, with starch solution as an indicator.

In the working examples cited below, parts by weight are expressed simply as parts.

EXAMPLE 1

Chloroprene rubber compositions obtained by kneading chloroprene rubber (CR) and ingredients in the proportions indicated in Table 1 in the sequence of addition indicated below were tested with a rheometer (at a fixed temperature of 180° C.) to obtain rheometer curves. Test pieces (Dumbbell No. 3, JIS) obtained by press molding the chloroprene rubber compositions at 153° C. for 30 minutes were tested for physical properties. The rheometer curves are shown in FIG. 1 and the results of the test for physical properties are shown in Table 2.

Sequence of addition of ingredients for keanding

Mastication of chloroprene rubber→stearic acid→MgO→sulfur or morpholine disulfite→age-resister→carbon black→process oil (plasticizer)→carbon black→process oil (plasticizer)→ZnO→thioglycolic acid ester or solid powder (obtained by using 200 parts of thioglycolic acid ester and 100 parts of white carbon, Nipsil VN3).

(Note: The solid powder will be indicated hereinafter by the letter "P" attached to the tail of the name of relevant ester.)

In the following table, No. 1-1 (Comp) represents a comparative experiment.

TABLE 1

| Ingredient | No. 1-1 (Comp.) | No. 1-1 | No. 1-2 | No. 1-3 | No. 1-4 | No. 1-5 |
|---|---|---|---|---|---|---|
| CR (WRT) | 100 | 100 | 100 | 100 | 100 | 100 |
| MgO | 4 | 4 | 4 | 4 | 4 | 4 |
| ZnO | 5 | 5 | 5 | 5 | 5 | 5 |
| Stearic acid | 1 | 1 | 1 | 1 | 1 | 1 |
| Carbon black (SRF) | 50 | 50 | 50 | 50 | 50 | 50 |
| Process oil | 10 | 10 | 10 | 10 | 10 | 10 |
| ETU | 0.5 | — | — | — | — | — |
| Triethylene glycol dithioglycolate | — | 1.0 | 2.0 | 2.0 | 2.0 | 2.0 |
| Morpholine disulfite* | — | — | 0.5 | 1.0 | — | — |
| Sulfur | — | — | — | — | 0.25 | 0.5 |

*The amount of morpholine disulfite added is indicated as equivalent sulfur content.

TABLE 2

| Item of test | No. 1-1 (Comp.) | No. 1-1 | No. 1-2 | No. 1-3 | No. 1-4 | No. 1-5 |
|---|---|---|---|---|---|---|
| Vulcanizing time (min.) | 10 | 10 | 15 | 15 | 25 | 25 |
| Hardness (JIS) | 64 | 63 | 63 | 62 | 63 | 62 |
| 100% Modulus (kg/cm$^2$) | 38 | 37 | 31 | 32 | 36 | 36 |
| 200% Modulus (kg/cm$^2$) | 106 | 98 | 81 | 82 | 93 | 90 |
| Tensile strength (kg/cm$^2$) | 135 | 164 | 154 | 141 | 165 | 154 |
| Elongation (%) | 240 | 300 | 320 | 290 | 310 | 310 |
| Tear strength (kg)cm$^2$) | 42 | 53 | 50 | 48 | 50 | 50 |

EXAMPLE 2

Figure 2:
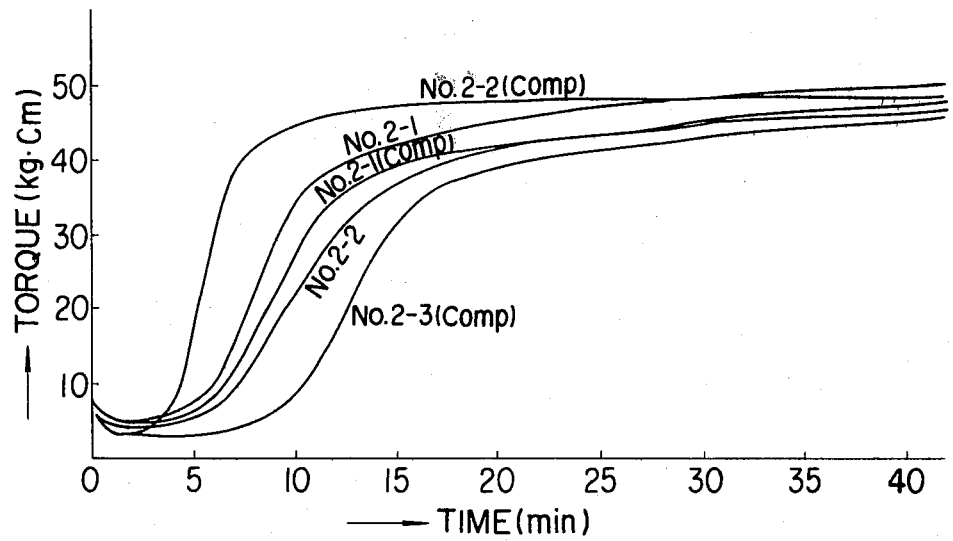
Figure 3:
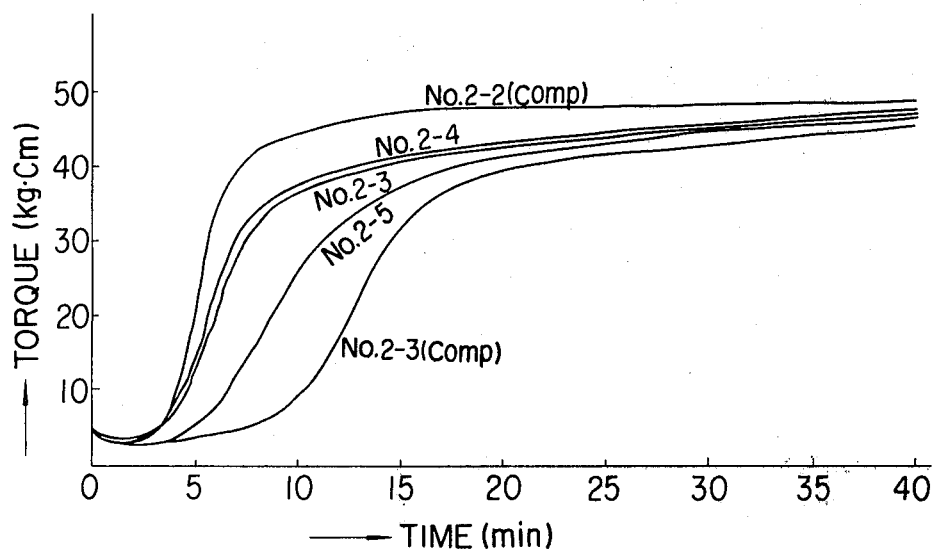

By following the procedure of Example 1, except that G-type chloroprene rubber (sulfur-modified type, PM-40) was used instead of CR, chloroprene rubber compositions were obtained by using the ingredients in the proportions of Table 3. They were tested with a rheometer (at a fixed temperature of 153° C.) and also tested for physical properties. The rheometer curves thus obtained are shown in FIG. 2 and FIG. 3. Test pieces obtained by press molding the chloroprene rubber compositions for varying lengths of period at a fixed temperature of 153° C.) were tested for physical properties. The results are shown in Table 4. Other test pieces obtained by press molding at 153° C. for 30 minutes were tested for high-temperature durability. The results are shown in Table 5. In these tables, No. 2-1 (Comp), No. 2-2 (Comp) and No. 2-3 (Comp) represent comparative experiments.

TABLE 3

| Item of test | No. 2-1 (Comp.) | No. 2-1 | No. 2-2 | No. 2-3 | No. 2-4 | No. 2-5 | No. 2-2 (Comp.) | No. 2-3 (Comp.) |
|---|---|---|---|---|---|---|---|---|
| CR (sulfur-modified type, PM-40) | 100 | 100 | 100 | 100 | 100 | 100 | 100 | 100 |
| MgO | 4 | 4 | 4 | 4 | 4 | 4 | 4 | 4 |
| ZnO | 5 | 5 | 5 | 5 | 5 | 5 | 5 | 5 |
| Stearic acid | 1 | 1 | 1 | 1 | 1 | 1 | 1 | 1 |
| Carbon black (HAF) | 35 | 35 | 35 | 35 | 35 | 35 | 35 | 35 |
| Process oil | 5 | 5 | 5 | 5 | 5 | 5 | 5 | 5 |
| Age-register (octylated diphenyl amine) | 2 | 2 | 2 | 2 | 2 | 2 | 2 | 2 |
| Triethylene glycol dithioglycolate | 0.25 | 0.25 | 0.25 | 0.375 | 0.375 | 0.375 | — | — |
| Sulfur | — | 0.25 | — | — | 0.375 | — | — | — |
| Morpholine disulfite* | — | — | 0.94 | — | — | 1.41 | — | — |
| ETU | — | — | — | — | — | — | 1.0 | — |

*The amount of morpholine disulfite added is indicated as equivalent sulfur content.

TABLE 4

| Test Run | Time of press molding (min) at 153° C. | Modulus (kg/cm²) 100% | 200% | 300% | Tensile strength (kg/cm²) | Elongation (%) | Hardness (JIS-A) |
|---|---|---|---|---|---|---|---|
| No. 2-1 (Comp.) | 15 | 33 | 79 | 150 | 291 | 550 | 66 |
| | 20 | 35 | 84 | 163 | 293 | 530 | 67 |
| | 30 | 35 | 92 | 202 | 293 | 470 | 68 |
| | 40 | 39 | 100 | 182 | 284 | 460 | 69 |
| No. 2-1 | 15 | 34 | 85 | 156 | 280 | 530 | 66 |
| | 20 | 38 | 93 | 166 | 284 | 490 | 67 |
| | 30 | 40 | 106 | 189 | 277 | 420 | 68 |
| | 40 | 42 | 112 | 201 | 268 | 420 | 69 |
| No. 2-2 | 15 | 32 | 79 | 143 | 279 | 530 | 66 |
| | 20 | 37 | 95 | 169 | 270 | 470 | 67 |
| | 30 | 40 | 105 | 189 | 272 | 410 | 68 |
| | 40 | 42 | 109 | 201 | 266 | 400 | 70 |
| No. 2-3 | 15 | 34 | 85 | 158 | 285 | 530 | 66 |
| | 20 | 35 | 88 | 167 | 291 | 490 | 68 |
| | 30 | 37 | 96 | 177 | 285 | 450 | 68 |
| | 40 | 40 | 104 | 183 | 285 | 430 | 69 |
| No. 2-4 | 15 | 34 | 91 | 168 | 290 | 500 | 66 |
| | 20 | 37 | 91 | 168 | 296 | 490 | 68 |
| | 30 | 42 | 108 | 197 | 282 | 420 | 68 |
| | 40 | 44 | 113 | 144 | 282 | 420 | 68 |
| No. 2-5 | 15 | 34 | 87 | 159 | 264 | 480 | 67 |
| | 20 | 40 | 99 | 178 | 299 | 480 | 68 |
| | 30 | 40 | 104 | 190 | 271 | 420 | 71 |
| | 40 | 45 | 114 | 201 | 259 | 380 | 72 |
| No. 2-2 (Comp.) | 15 | 44 | 112 | 195 | 270 | 410 | 68 |
| | 20 | 43 | 115 | 206 | 268 | 390 | 69 |
| | 30 | 46 | 124 | 220 | 270 | 370 | 70 |
| | 40 | 49 | 132 | 225 | 264 | 340 | 71 |
| No. 2-3 (Comp.) | 15 | 27 | 64 | 118 | 275 | 640 | 62 |
| | 20 | 32 | 80 | 148 | 270 | 520 | 66 |
| | 30 | 35 | 87 | 161 | 282 | 490 | 67 |
| | 40 | 39 | 98 | 173 | 283 | 460 | 67 |

TABLE 5

| Test Run | Time (hr) of standing in test tube at 120° C. | Hardness (JIS-A) | Modulus 100% (kg/cm²) | Tensile strength (kg/cm²) | Elongation (%) | Tear strength (kg/cm) | Permanent compression set (%) under 25% compression at 100° C. × 22 hr |
|---|---|---|---|---|---|---|---|
| No. 2-1 (Comp.) | 0 | 68 | 35 | 293 | 470 | 69 | 60.0 |
| | 240 | 82 | 112 | 207 | 200 | — | |
| No. 2-1 | 0 | 68 | 40 | 277 | 420 | 68 | 61.4 |
| | 240 | 84 | 137 | 210 | 160 | — | |
| No. 2-2 | 0 | 68 | 40 | 272 | 410 | 66 | 62.2 |

TABLE 5-continued

| Test Run | Time (hr) of standing in test tube at 120° C. | Hardness (JIS-A) | Modulus 100% (kg/cm²) | Tensile strength (kg/cm²) | Elongation (%) | Tear strength (kg/cm) | Permanent compression set (%) under 25% compression at 100° C. × 22 hr |
|---|---|---|---|---|---|---|---|
|  | 240 | 83 | 121 | 202 | 180 | — |  |
| No. 2-3 | 0 | 68 | 37 | 285 | 450 | 64 | 55.2 |
|  | 240 | 82 | 117 | 208 | 190 | — |  |
| No. 2-4 | 0 | 68 | 42 | 282 | 420 | 66 | 65.2 |
|  | 240 | 85 | 141 | 214 | 160 | — |  |
| No. 2-5 | 0 | 71 | 40 | 271 | 420 | 66 | 65.4 |
|  | 240 | 84 | 130 | 184 | 160 | — |  |
| No. 2-2 (Comp.) | 0 | 70 | 46 | 270 | 370 | 63 | 54.8 |
|  | 240 | 83 | 114 | 215 | 190 | — |  |
| No. 2-3 (Comp.) | 0 | 67 | 35 | 282 | 490 | 68 | 71.7 |
|  | 240 | 84 | 119 | 180 | 160 | — |  |

EXAMPLE 3

Figure 4:
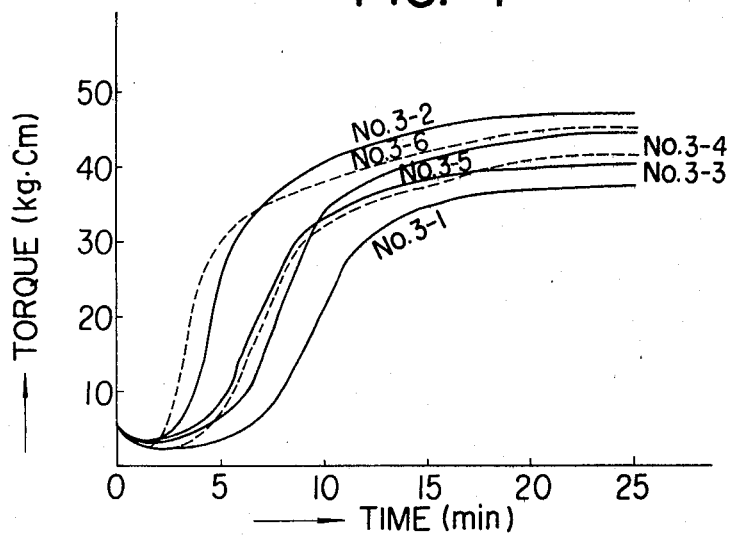
Figure 5:
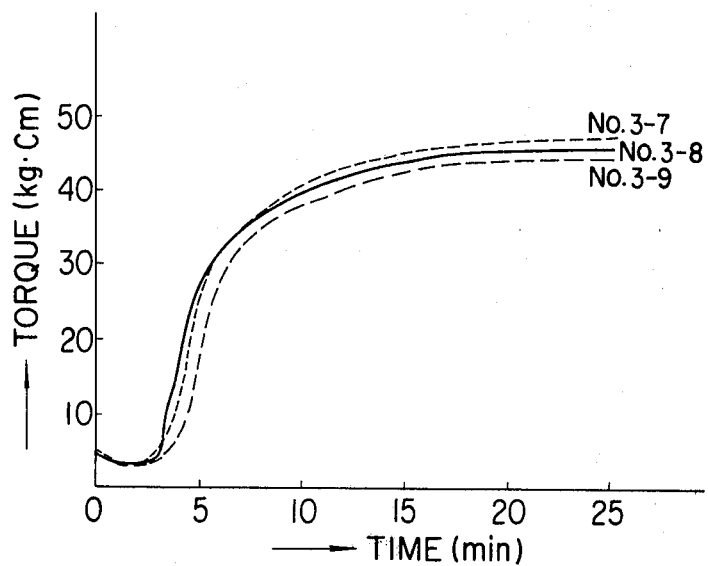

Chloroprene rubber compositions obtained by using various thioglycolic acid esters other than triethylene glycol dithioglycolate were tested with a rheometer (at a fixed temperature of 153° C.). The rheometer curves obtained by this test are shown in FIG. 4 and FIG. 5. The ingredients used in these compositions were identical with those enumerated between CR (in the top line) and the age-resister, inclusive, in Table 3. The amount of the thioglycolic acid ester added relative to 100 parts by weight of chloroprene rubber was varied as indicated in Table 6.

TABLE 6

| Test Run | Thioglycolic acid ester | Amount per 100 parts by weight of CR |
|---|---|---|
| No. 3-1 | 2-Ethylhexyl thioglycolate | 0.3 parts by weight |
| No. 3-2 | Ethylene glycol dithioglycolate | 0.3 |
| No. 3-3 | Triethylene glycol dithioglycolate | 0.3 |
| No. 3-4 | Trimethylolpropane trithioglycolate | 0.3 |
| No. 3-5 | Pentaerythritol tetrathioglycolate | 0.3 |
| No. 3-6 | Triethylene glycol dithioglycolate | 0.6 |
| No. 3-7 | Propylene glycol dithioglycolate | 0.3 |
| No. 3-8 | 1,4-Butylene glycol dithioglycolate | 0.3 |
| No. 3-9 | 2-Mercaptoethanol thioglycolate | 0.3 |

From the working examples cited so far, it is noted that various thioglycolic acid esters, used as vulcanization accelerators for chloroprene rubber, are effective in improving the physical properties of chloroprene rubber as compared with ETU.

EXAMPLE 4

In a high-speed fluidifying mixer (super mixer), a varying thioglycolic acid ester and white carbon were mixed at room temperature at a rate of 1000 rpm. Then the mixing was briefly suspended to permit addition of vanillin to the mixture within and the mixing was subsequently resumed. Table 7 shows the conditions of adsorption (impregnation) and the time-course change of the thioglycolic acid ester content in the powder composition having the thioglycolic acid ester adsorbed thereon.

TABLE 7

|  |  | No. 4-1 | No. 4-2 | No. 4-3 | No. 4-4 | No. 4-5 | No. 4-6 | No. 4-7 |
|---|---|---|---|---|---|---|---|---|
| Ethylene glycol dithioglycolate |  | 200 parts | 200 | 200 | 200 | 200 | 200 | Triethylene glycol dithioglycolate 200 |
| Inorganic powder | Trademark designation | Nipsil LP | Nipsil VN3 | Nipsil ER | CaCO₃ | Carbon black (MPC) | Crown clay | Nipsil VN3 |
|  | pH value | 5.5–6.5 | 5.5–6.5 | 7–8.5 | 9.4 | 5 | 5.1 | 5.5–6.5 |
|  | Amount added (parts) | 100 | 100 | 100 | 100 | 100 | 100 | 100 |
| Mixing time (min) |  | 3 | 3 | 3 | 3 | 3 | 3 | 3 |
| Vanillin (parts) |  | 0.3 | 0.3 | 0.3 | 0.3 | 0.3 | 0.3 | 0.3 |
| Mixing time after addition of vanillin (min) |  | 2 | 2 | 2 | 2 | 2 | 2 | 2 |
| Thioglycolic acid ester content (at 40° C.) | Immediately after mixing | 61.7 | 61.7 | 61.6 | 61.1 | 61.5 | 61.6 | 61.3 |
|  | 10 days after mixing | 61.5 | 61.6 | 55.4 | 57.9 | 61.4 | 48.5 | 61.2 |
|  | 20 days after mixing | 61.4 | 61.3 | 51.1 | 18.3 | 61.4 | 24.4 | 61.2 |
|  | 30 days after mixing | 61.4 | 61.2 | 48.7 | — | 61.3 | 11.0 | 61.1 |
|  | 60 days after mixing | 61.1 | 61.2 | — | — | 61.2 | — | 60.9 |

The other physical properties of the inorganic powders used are shown below.

| White carbon | Nipsil VN3 | Nipsil LP | Nipsil KR |
|---|---|---|---|
| Water content (%) | 7–9 | 7–9 | 4–7 |
| Portion stopped by | less than 7 | less than 0.5 | less than 5 |

-continued

Figure 6:
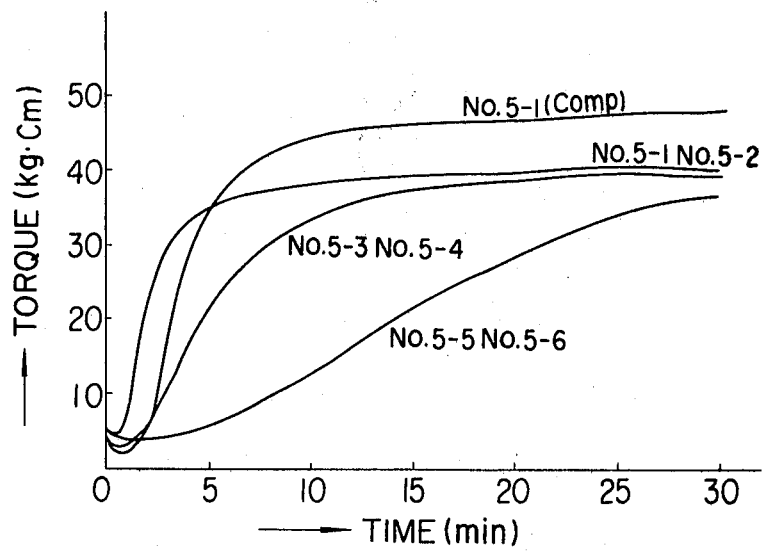

| sifting (%) | (100 Mesh) | (325 Mesh) | (100 Mesh) |
|---|---|---|---|
| Bulk density (loose weight), (g/liter) | 120–160 | 60–80 | 90–130 |
| Bulk density (shaken weight), (g/liter) | 240–300 | — | 200–260 |
| pH (4% suspension) | 5.5–6.5 | 5.5–6.5 | 7–8.5 |
| DBA adsorption (mg-mol/kg) | 240–290 | 240–290 | — (due to alkaline) |
| Lot size (kg) | 30.000 | 15.000 | 30.000 | the proportions shown in Table 8 were tested with a rheometer (at a fixed temperature of 180° C.) to obtain rheometer curves. Test pieces (Dumbbell No. 3, JIS) obtained by press molding these chloroprene rubber compositions at 153° C. for varying lengths of press time (vulcanizing time) indicated in Table 9 were tested for physical properties. The rheometer curves are shown in FIG. 6 and the results of the test for physical properties are shown in Table 9. In the table, No. 5 (Comp) represents a comparative experiment.

TABLE 8

| | Test Run | | | | | | |
|---|---|---|---|---|---|---|---|
| Ingredient | No. 5 (Comp.) | No. 5-1 | No. 5-2 | No. 5-3 | No. 5-4 | No. 5-5 | No. 5-6 |
| CR (WRT) | 100 | 100 | 100 | 100 | 100 | 100 | 100 |
| MgO | 4 | 4 | 4 | 4 | 4 | 4 | 4 |
| ZnO | 5 | 5 | 5 | 5 | 5 | 5 | 5 |
| Stearic acid | 1 | 1 | 1 | 1 | 1 | 1 | 1 |
| Carbon black (SRF) (Note 1) | 50 | 50 | 50 | 50 | 50 | 50 | 50 |
| Process oil | 10 | 10 | 10 | 10 | 10 | 10 | 10 |
| ETU | 0.5 | — | — | — | — | — | — |
| Triethylene glycol dithioglycolate | — | 1.0 | — | 2.0 | — | 2.0 | — |
| Triethylene glycol dithioglycolate (P) (Note 2) | — | — | 1.5 | — | 3.0 | — | 3.0 |
| Morpholine disulfite (Note 3) | — | — | — | 0.5 | 0.5 | — | — |
| Sulfur | — | — | — | — | — | 0.25 | 0.25 |

(Note 1) Physical properties of carbon black (SRF): Specific gravity 1.8, average particle diameter 76 mµ, surface area 28 m²/g, pH 7.5, and oil absorption 0.8 cc/g.
(Note 2) The amount of thioglycolic acid ester is equalized in pure equivalent weight.
(Note 3) The amount of morpholine disulfite is indicated in equivalent weight of sulfur.

TABLE 9

| | Test Run | | | | | | |
|---|---|---|---|---|---|---|---|
| Item of test | No. 5 (Comp.) | No. 5-1 | No. 5-2 | No. 5-3 | No. 5-4 | No. 5-5 | No. 5-6 |
| Vulcanizing time (min.) | 10 | 10 | 10 | 15 | 15 | 25 | 25 |
| Hardness (JIS) | 64 | 63 | 63 | 63 | 63 | 63 | 63 |
| 100% Modulus (kg/cm²) | 38 | 37 | 38 | 31 | 32 | 36 | 36 |
| 200% Modulus (kg/cm²) | 106 | 98 | 99 | 81 | 83 | 93 | 94 |
| Tensile strength (kg/cm²) | 135 | 164 | 164 | 154 | 156 | 165 | 165 |
| Elongation (%) | 240 | 300 | 300 | 320 | 320 | 310 | 310 |
| Tear strength (kg/cm) | 42 | 53 | 53 | 50 | 50 | 50 | 50 |

| Physical properties of carbon black (MPC) | |
|---|---|
| Specific gravity | 1.8 |
| Average particle diameter | 27 mµ |
| Surface area | 115 m²/g |
| Oil adsorption | 1.20 cc/g |

EXAMPLE 5

Chloroprene rubber compositions obtained by kneading chloroprene rubber (CR) and other ingredients in

EXAMPLE 6

Figure 7:
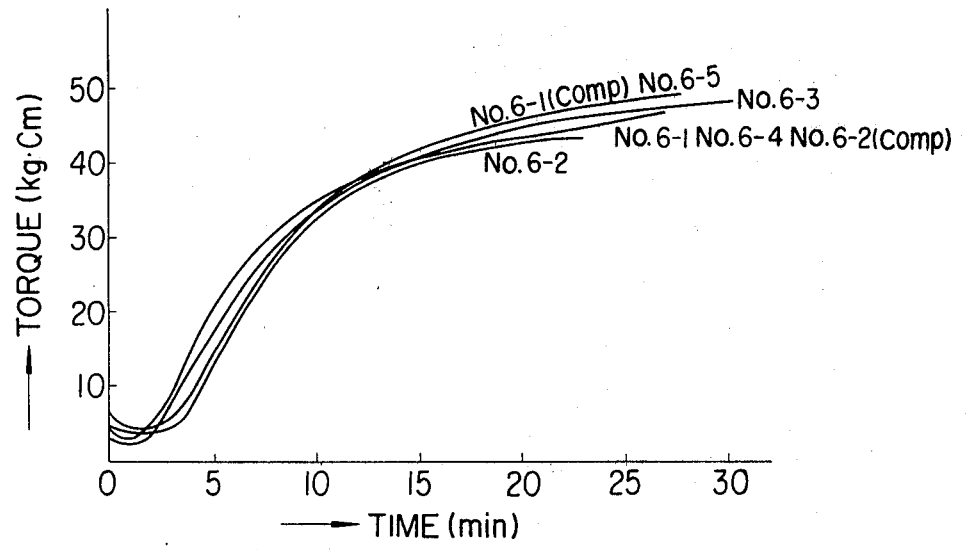

By following the procedure of Example 5, chloroprene rubber compositions were obtained by kneading the ingredients in the proportions shown in Table 10 and they were tested with a rheometer (at a fixed temperature of 160° C.) and also tested for physical properties. The rheometer curves thus obtained are shown in FIG. 7. The results of the test for physical properties are shown in Table 11. In the table, No. 6-1 (Comp.) and No. 6-2 (Comp.) represent comparative experiments.

TABLE 10

| | Test Run | | | | | | |
|---|---|---|---|---|---|---|---|
| Ingredient | No. 6-1 (Comp.) | No. 6-2 (Comp.) | No. 6-1 | No. 6-2 | No. 6-3 | No. 6-4 | No. 6-5 |
| CR (WRT) | 100 | 100 | 100 | 100 | 100 | 100 | 100 |
| MgO | 4 | 4 | 4 | 4 | 4 | 4 | 4 |
| ZnO | 5 | 5 | 5 | 5 | 5 | 5 | 5 |
| Stearic acid | 1 | 1 | 1 | 1 | 1 | 0.5 | 0.5 |
| Carbon black (SRF) | 50 | 50 | 50 | — | — | 30 | 30 |
| Carbon black (FEF) (Note 4) | — | — | — | 25 | 25 | 25 | 25 |
| H—clay | — | — | — | 45 | 45 | — | — |
| Process oil | 10 | 10 | 10 | 15 | 15 | — | — |
| DOP (Note 1) | — | — | — | — | — | 10 | 10 |
| DOS (Note 2) | — | — | — | — | — | 15 | 15 |

TABLE 10-continued

| | Test Run | | | | | | |
|---|---|---|---|---|---|---|---|
| Ingredient | No. 6-1 (Comp.) | No. 6-2 (Comp.) | No. 6-1 | No. 6-2 | No. 6-3 | No. 6-4 | No. 6-5 |
| OD-3 (Note 3) | — | — | — | 2 | 2 | 2 | 2 |
| ETU | 0.5 | — | — | — | 0.7 | — | 0.7 |
| Ethylene glycol dithioglycolate | — | 1.0 | — | — | — | — | — |
| Ethylene glycol dithioglycolate (P) | — | — | 1.5 | 1.5 | — | 1.5 | — |

(Note 1) DOP: Dioctyl phthalate
(Note 2) DOS: Dioctyl sebacate
(Note 3) OD-3: Octylated diphenyl amine
(Note 4) Physical properties of carbon black (FEF): Specific gravity 1.8, average particle diameter 46 mμ, surface area 49 m$^2$/g, pH 7.7, and oil absorption 1.2 cc/g.

TABLE 11

| Test Run | Press molding | Time of standing in test tube at 120° C. | Modulus (kg/cm$^2$) 100% | 200% | 300% | Hardness (JIS-A) | Tensile strength (kg/cm$^2$) | Elongation (%) | Tear strength (kg/cm) | Permanent compression set (%) |
|---|---|---|---|---|---|---|---|---|---|---|
| No. 6-1 (Comp.) | 150° C. × 20 min | | 37 | 86 | 162 | 67 | 180 | 330 | 45 | — |
| | 150° C. × 30 min | | 38 | 90 | — | 66 | 167 | 290 | 44 | 36.0 |
| No. 6-2 (Comp.) | 150° C. × 20 min | | 42 | 95 | 160 | 66 | 207 | 400 | 53 | — |
| | 150° C. × 30 min | | 44 | 103 | 178 | 68 | 204 | 340 | 54 | 37.7 |
| No. 6-1 | 150° C. × 20 min | | 41 | 94 | 158 | 66 | 204 | 400 | 54 | — |
| | 150° C. × 30 min | | 45 | 104 | 178 | 68 | 203 | 340 | 55 | 37.5 |
| No. 6-2 | 160° C. × 20 min | 0 | 43 | 72 | 98 | 66 | 169 | 540 | — | 160° C. × 25 min Vulcanization |
| | | 4 days | 66 | 109 | 130 | 74 | 161 | 460 | — | |
| | | 8 | 79 | 128 | 141 | 77 | 150 | 360 | — | 35.4 |
| | 160° C. × 30 min | 0 | 44 | 78 | 107 | 66 | 171 | 500 | — | |
| | | 4 | 65 | 110 | 137 | 75 | 165 | 450 | — | |
| | | 8 | 79 | 128 | 152 | 79 | 154 | 340 | — | |
| No. 6-3 | 160° C. × 20 min | 0 | 38 | 64 | 100 | 65 | 159 | 450 | — | 35.2 |
| | | 4 | 47 | 78 | 112 | 72 | 157 | 430 | — | |
| | | 8 | 59 | 91 | 117 | 76 | 138 | 390 | — | |
| | 160° C. × 30 min | 0 | 37 | 67 | 108 | 64 | 163 | 430 | — | |
| | | 4 | 48 | 80 | 117 | 72 | 154 | 420 | — | |
| | | 8 | 59 | 92 | 124 | 77 | 144 | 390 | — | |
| No. 6-4 | 160° C. × 20 min | 0 | 40 | 88 | 149 | 63 | 183 | 360 | — | 23.4 |
| | | 4 | 51 | 102 | 146 | 69 | 168 | 350 | — | |
| | | 8 | 54 | 93 | — | 72 | 126 | 300 | — | |
| | 160° C. × 30 min | 0 | 41 | 90 | 152 | 61 | 180 | 360 | — | |
| | | 4 | 47 | 95 | 143 | 68 | 167 | 360 | — | |
| | | 8 | 48 | 88 | — | 71 | 119 | 290 | — | |
| No. 6-5 | 160° C. × 20 min | 0 | 44 | 109 | — | 62 | 163 | 270 | — | 18.6 |
| | | 4 | 45 | 99 | — | 66 | 156 | 290 | — | |
| | | 8 | 48 | 96 | — | 71 | 121 | 270 | — | |
| | 160° C. × 30 min | 0 | 48 | 119 | — | 63 | 161 | 250 | — | |
| | | 4 | 44 | 108 | — | 67 | 157 | 270 | — | |
| | | 8 | 48 | 108 | — | 70 | 129 | 260 | — | |

EXAMPLE 7

Figure 8:
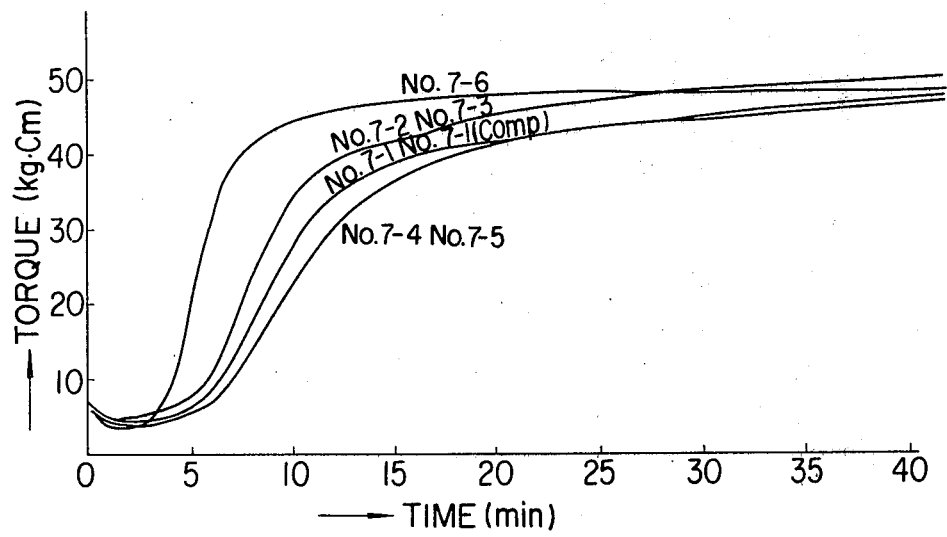

By following the procedure of Example 5, chloroprene rubber compositions were obtained by kneading G type chloroprene rubber (sulfur-modified type, PM-40) and other ingredients in the proportions indicated in Table 12 and they were tested with a rheometer (at a fixed temperature of 153° C.) and also tested for physical properties. The rheometer curves thus obtained are shown in FIG. 8. Test pieces obtained by press molding the chloroprene rubber compositions at a temperature of 153° C. for varying lengths of time were tested for physical properties. The results are shown in Table 13. Test pieces obtained by pressing the chloroprene rubber compositions at 153° C. for 30 minutes were subjected to a test for high-temperature durability. The results are shown in Table 14.

TABLE 12

| | Test Run | | | | | | |
|---|---|---|---|---|---|---|---|
| Ingredient | No. 7 (Comp.) | No. 7-1 | No. 7-2 | No. 7-3 | No. 7-4 | No. 7-5 | No. 7-6 |
| CR (sulfur-modified type, PM-40) | 100 | 100 | 100 | 100 | 100 | 100 | 100 |
| MgO | 4 | 4 | 4 | 4 | 4 | 4 | 4 |
| ZnO | 5 | 5 | 5 | 5 | 5 | 5 | 5 |
| Stearic acid | 1 | 1 | 1 | 1 | 1 | 1 | 1 |
| Carbon black (HAF) (Note 3) | 35 | 35 | 35 | 35 | 35 | 35 | 35 |
| Process oil | 5 | 5 | 5 | 5 | 5 | 5 | 5 |
| Age-register (octylated diphenyl amine) | 2 | 2 | 2 | 2 | 2 | 2 | 2 |
| Triethylene glycol | 0.25 | — | 0.25 | — | 0.25 | — | — |

TABLE 12-continued

|  | Test Run | | | | | | |
|---|---|---|---|---|---|---|---|
| Ingredient | No. 7 (Comp.) | No. 7-1 | No. 7-2 | No. 7-3 | No. 7-4 | No. 7-5 | No. 7-6 |
| dithioglycolate | | | | | | | |
| Triethylene glycol dithioglycolate (P) (Note 1) | | 0.375 | — | 0.375 | — | 0.375 | — |
| Sulfur | | | 0.25 | 0.25 | — | — | — |
| Morpholine disulfite (Note 2) | | — | — | 0.94 | 0.94 | — | |
| ETU | | | | — | — | — | 1.0 |

(Note 1) The amount of thioglycolic acid ester equalized in pure equivalent weight.
(Note 2) The amount of morpholine disulfite is indicated in equivalent weight of sulfur.
(Note 3) Physical properties of carbon black (HAF): Specific gravity 1.8, average particle diameter 28 mμ, surface area 90 m$^2$/g, pH 8.0 and oil absorption 1.2 cc/g.

TABLE 13

|  |  | Item of Test | | | | | |
|---|---|---|---|---|---|---|---|
| Test Run | Time of press molding (min) at 153° C. | Modulus (kg/cm$^2$) | | | Tensile strength (kg/cm$^2$) | Elongation (%) | Hardness (JIS-A) |
|  |  | 100% | 200% | 300% |  |  |  |
| No. 7 (Comp.) | 15 | 33 | 79 | 150 | 291 | 550 | 66 |
|  | 20 | 35 | 84 | 163 | 293 | 530 | 67 |
|  | 30 | 35 | 92 | 202 | 293 | 470 | 68 |
|  | 40 | 39 | 100 | 182 | 284 | 460 | 69 |
| No. 7-1 | 15 | 34 | 79 | 151 | 290 | 550 | 66 |
|  | 20 | 35 | 85 | 165 | 295 | 540 | 67 |
|  | 30 | 36 | 93 | 204 | 296 | 470 | 68 |
|  | 40 | 39 | 102 | 183 | 288 | 460 | 69 |
| No. 7-2 | 15 | 34 | 85 | 156 | 280 | 530 | 66 |
|  | 20 | 38 | 93 | 166 | 284 | 490 | 67 |
|  | 30 | 40 | 106 | 189 | 277 | 420 | 68 |
|  | 40 | 42 | 112 | 201 | 268 | 420 | 69 |
| No. 7-3 | 15 | 34 | 86 | 158 | 281 | 530 | 66 |
|  | 20 | 39 | 95 | 167 | 284 | 480 | 67 |
|  | 30 | 40 | 107 | 189 | 278 | 420 | 68 |
|  | 40 | 42 | 114 | 203 | 270 | 410 | 69 |
| No. 7-4 | 15 | 32 | 79 | 143 | 279 | 530 | 66 |
|  | 20 | 37 | 95 | 169 | 270 | 470 | 67 |
|  | 30 | 40 | 105 | 189 | 272 | 410 | 68 |
|  | 40 | 42 | 109 | 201 | 266 | 400 | 70 |
| No. 7-5 | 15 | 33 | 80 | 145 | 280 | 530 | 66 |
|  | 20 | 37 | 96 | 168 | 270 | 460 | 66 |
|  | 30 | 41 | 107 | 190 | 272 | 400 | 68 |
|  | 40 | 43 | 111 | 202 | 265 | 400 | 70 |
| No. 7-6 | 15 | 44 | 112 | 195 | 270 | 410 | 68 |
|  | 20 | 43 | 115 | 206 | 268 | 390 | 69 |
|  | 30 | 46 | 124 | 220 | 270 | 370 | 70 |
|  | 40 | 49 | 132 | 225 | 264 | 340 | 71 |

TABLE 14

|  |  | Item of test | | | | | |
|---|---|---|---|---|---|---|---|
| Test Run | Time (hr) of standing in test tube at 120° C. | Hardness (JIS-A) | Modulus 100% (kg/cm$^2$) | Tensile strength (kg/cm$^2$) | Elongation (%) | Tear strength (kg/cm) | Permanent compression set (%) under 25% compression at 100° C. × 22 hr |
| No. 7 (Comp.) | 0 | 68 | 35 | 293 | 470 | 69 | 60.0 |
|  | 240 | 82 | 112 | 207 | 200 | — | |
| No. 7-1 | 0 | 68 | 36 | 296 | 470 | 69 | 60.2 |
|  | 240 | 83 | 115 | 205 | 210 | — | |
| No. 7-2 | 0 | 68 | 40 | 277 | 420 | 68 | 61.4 |
|  | 240 | 84 | 137 | 210 | 160 | — | |
| No. 7-3 | 0 | 68 | 40 | 278 | 420 | 68 | 61.2 |
|  | 240 | 83 | 138 | 212 | 170 | — | |
| No. 7-4 | 0 | 68 | 40 | 272 | 410 | 66 | 62.2 |
|  | 240 | 83 | 121 | 202 | 180 | — | |
| No. 7-5 | 0 | 68 | 41 | 272 | 400 | 65 | 62.0 |
|  | 240 | 84 | 120 | 200 | 180 | — | |
| No. 7-6 | 0 | 70 | 46 | 270 | 370 | 63 | 54.8 |
|  | 240 | 83 | 114 | 215 | 190 | — | |

EXAMPLE 8

Figure 9:
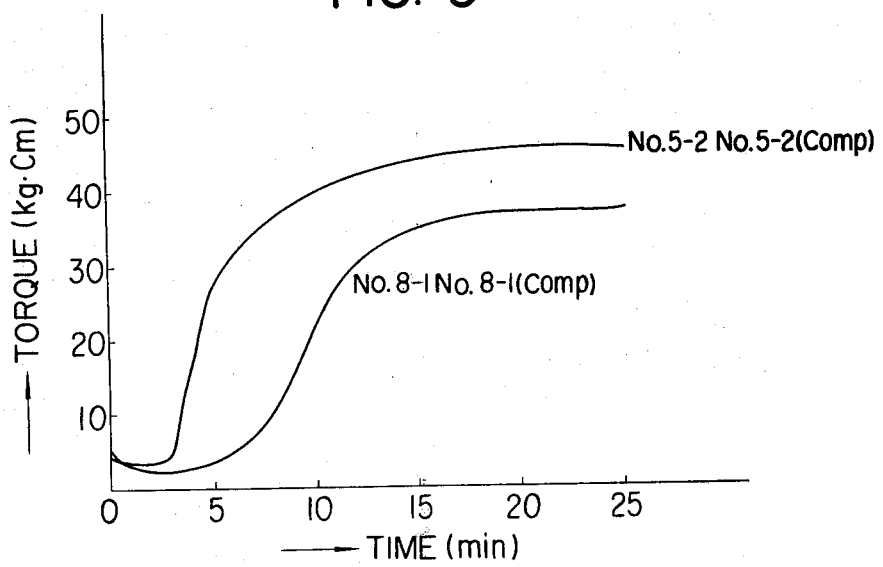

Chloroprene rubber compositions obtained by using various thioglycolic acid esters other than those of Examples 5-7 and corresponding solid powders having these esters adsorbed on white carbon, Nipsil VN3 were tested with a rheometer (at a fixed temperature of 153° C.). The rheometer curves thus obtained are shown in FIG. 9. The other ingredients used in the compositions were identical with those enumerated between CR in the top line and the age-resister, inclusive, of Table 12. The amounts in which the thioglycolic acid esters and the corresponding solid powders (having 200 parts of each ester adsorbed on 100 parts of white carbon, Nipsil VN3) were added per 100 parts by weight of chloroprene rubber are shown in Table 15.

TABLE 15

| Test Run | Thioglycolic acid ester and corresponding solid powder | Amount added per 100 parts of CR100 |
|---|---|---|
| No. 8-1 (Comp.) | 2-Ethylhexyl thioglycolate | 0.3 |
| No. 8-2 (Comp.) | 1,4-Butylene glycol dithioglycolate | 0.3 |
| No. 8-1 | 2-Ethylhexyl thioglycolate (P) | 0.45 |
| No. 8-2 | 1,4-Butylene gylcol dithioglycolate (P) | 0.45 |

EXAMPLE 9

Figure 10:
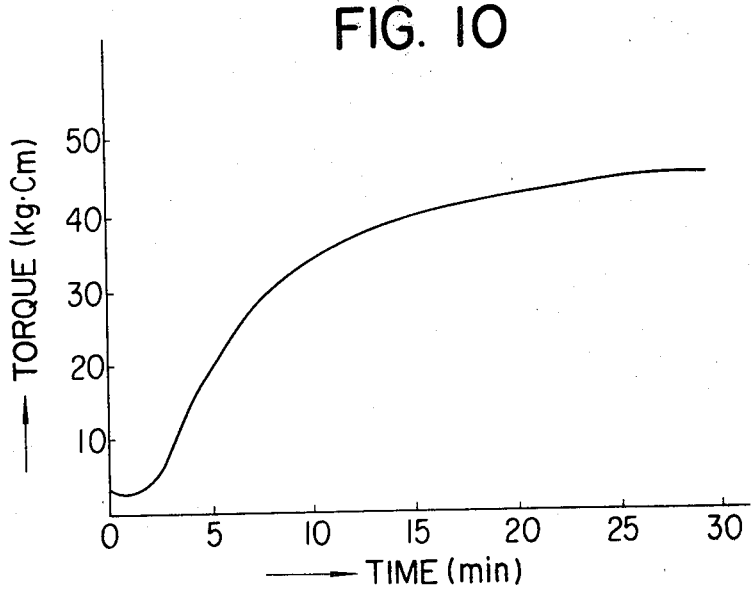
Figure 11:
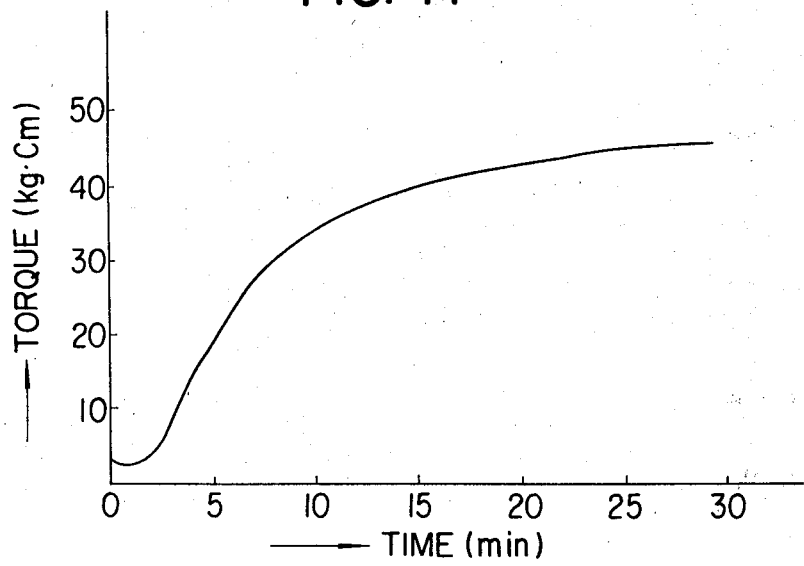

CaCO3 and crown clay, each 100 parts, were impregnated with 200 parts of ethylene glycol dithioglycolate. Chloroprene rubber compositions were obtained by kneading 100 parts by weight of chloroprene rubber and the ingredients identical with those enumerated between CR in the top line and the process oil, inclusive, under No. 6-1 in Table 10 in the proportions indicated correspondingly in this table, with the solid powders used in the amount of 1.5 parts. These compositions were tested with a rheometer (at a fixed temperature of 153° C.). The rheometer curves consequently obtained are shown in FIG. 10 (CaCO3) and FIG. 11 (crown clay).

EXAMPLE 10

By following the procedure of Example 5, chloroprene rubber compositions were obtained by kneading the ingredients shown in Table 16. These compositions were tested for physical properties. The results of this test are shown in Table 17.

TABLE 16

| | Test Run | | |
|---|---|---|---|
| Ingredients | No. 10-1 | No. 10-2 | No. 10-3 |
| CR (WRT) | 100 | 100 | 100 |
| MgO | 4 | 4 | 4 |
| ZnO | 5 | 5 | 5 |
| Stearic acid | 1 | 1 | 1 |
| Carbon black (SRF) | 50 | 50 | 50 |
| Process oil | 10 | 10 | 10 |
| Solid powder 1 | 1.5 | — | — |
| Solid powder 2 | — | 1.5 | — |
| Solid powder 3 | — | — | 1.5 |

Solid powder 1: Obtained by having carbon black MPC (100 parts) impregnated with triethylene glycol dithioglycolate (200 parts).
Solid powder 2: Obtained by having CaCO3 (100 parts) impregnated with triethylene glycol dithioglycolate (200 parts).
Solid powder 3: Obtained by having crown clay (100 parts) impregnated with triethylene glycol dithioglycolate (200 parts).

The solid powders 1-3 were impregnated with triethylene glycol and immediately kneaded in rubber.

TABLE 17

| | Test Run | | |
|---|---|---|---|
| Item of test | No. 10-1 | No. 10-2 | No. 10-3 |
| Vulcanizing time | 10 | 10 | 10 |

TABLE 17-continued

| | Test Run | | |
|---|---|---|---|
| Item of test | No. 10-1 | No. 10-2 | No. 10-3 |
| Hardness (JIS-A) | 63 | 63 | 63 |
| 100% Modulus (kg/cm$^2$) | 38 | 37 | 37 |
| 200% Modulus (kg/cm$^2$) | 99 | 98 | 98 |
| Tensile strength (kg/cm$^2$) | 164 | 163 | 162 |
| Elongation (%) | 300 | 300 | 300 |
| Tear Strength (kg/cm) | 53 | 52 | 52 |

EXAMPLE 11

By kneading the ingredients indicated below, there was obtained a composition (vulcanization accelerator) having a thioglycolic acid ester contained in a high concentration in chloroprene rubber.

| | |
|---|---|
| CR (WRT) | 100 parts |
| MgO | 10 |
| Process oil | 10 |
| Solid powder: (having white carbon Nipsil VN3 (100 parts) impregnated with 200 parts of ethylene glycol dithioglycolate) | 50 |
| Octylated diphenyl amine | 2 |

Immediately after its preparation, the vulcanization accelerator had a SH content of 17.4%. After this vulcanization accelerator was left to stand at 40° C. for 60 days, it showed a SH content of 17.4%. Thus, it was found to possess high durability at room temperature.

Rubber products were obtained by kneading the following ingredients including the aforementioned composition (vulcanization accelerator) in the proportions indicated correspondingly.

| | |
|---|---|
| CR (WRT) | 100 parts |
| Carbon black (SRF) | 50 |
| MgO | 4 |
| ZnO | 5 |
| Stearic acid | 1 |
| Process oil | 10 |
| Vulcanization accelerator | 5.2 |
| Octylated diphenyl amine | 2 |

The physical properties exhibited by the rubber products were equivalent to those exhibited by rubber products manufactured by using solid powders from the beginning.

I claim:

1. A vulcanization accelerator composition for chloroprene rubber comprising an inorganic powder impregnated with a thioglycolic acid ester.

2. The vulcanization accelerator composition according to claim 1, wherein the inorganic powder is white carbon, carbon black, activated clay, calcium carbonate, diatomaceous earth, clay, alumina, zeolite or activated carbon.

3. The vulcanization accelerator composition according to claim 1, wherein the inorganic powder is white carbon or carbon black.

4. The vulcanization accelerator composition according to claim 1, wherein the inorganic powder is of a nature such that when it is stirred in water, the supernatant liquid consequently obtained has a pH value of not more than 9.

5. The vulcanization accelerator composition according to claim 1, wherein the thioglycolic acid ester is an ester of a monohydric alcohol or a polyhydric (dihydric-hexahydric) alcohol and a thioglycolic acid.

6. The vulcanization accelerator composition according to claim 5, wherein the monohydric alcohol is an aliphatic saturated alcohol, an aliphatic unsaturated alcohol, an alicyclic alcohol, an aromatic alcohol or a heterocyclic alcohol.

7. The vulcanization accelerator composition according to claim 5, wherein the polyhydric alcohol is represented by the formula:

wherein $R^1$ represents a divalent cyclic hydrocarbon group, a saturated or unsaturated divalent acyclic hydrocarbon group, a divalent alicyclic hydrocarbon group or a divalent aromatic hydrocarbon group.

8. The vulcanization accelerator composition according to claim 5, wherein the polyhydric alcohol is an ether alcohol selected from the group consisting of ethylene glycol, diethylene glycol, triethylene glycol, polyethylene glycol, propylene glycol, dipropylene glycol, tripropylene glycol and polypropylene glycol.

9. The vulcanization accelerator composition according to claim 5, wherein the polyhydric alcohol is a dihydric alcohol represented by the general formula:

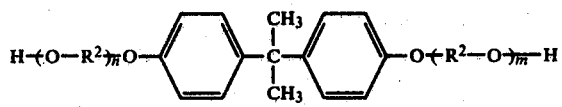

(wherein, n and m represent equal or different integers each having the value of at least 1 and $R^2$ represents a $$-CH_2CH_2- \text{ or } CH_3-\underset{|}{CH}-CH_2-).$$

10. The vulcanization accelerator composition according to claim 5, wherein the polyhydric alcohol is glycerin, trimethylolpropane, pentaerythritol or dipentaerythritol.

* * * * *